United States Patent
Bogut

[15] 3,686,530
[45] Aug. 22, 1972

[54] CURRENT LIMITED BATTERY PACK

[72] Inventor: Henry A. Bogut, Chicago, Ill.
[73] Assignee: Motorola, Inc., Franklin Park, Ill.
[22] Filed: April 23, 1971
[21] Appl. No.: 136,922

[52] U.S. Cl. ..................317/16, 317/33 SC, 320/40
[51] Int. Cl. ..........................H02h 3/08, H02h 7/18
[58] Field of Search................317/33 SC, 16; 320/40

[56] References Cited

UNITED STATES PATENTS 3,343,060  9/1967  Ingraham.....................320/40
3,475,653  10/1969  Onenberg et al. ...........317/16

*Primary Examiner*—James D. Trammell
*Attorney*—Vincent J. Rauner and M. N. Dickler

[57] ABSTRACT

A battery pack includes a resettable protection circuit for limiting the current to a load, which includes a normally nonconductive silicon controlled rectifier and a magnetic reed switch serially connected across a battery. When excessive load current develops, the silicon controlled rectifier is rendered conductive which in turn cuts off a regulating transistor or energizes a relay to prevent current flow to the load. The battery, magnetic reed switch, silicon controlled rectifier and regulating transistor or relay are encased in a sealed container to prevent sparks and arcing and allow usage in a hazardous atmosphere. The silicon controlled rectifier is reset, to allow continued usage of the battery, by actuating the reed switch with an externally supplied magnetic field. Actuation of the reed switch breaks the current path to the silicon controlled rectifier.

17 Claims, 3 Drawing Figures

Patented Aug. 22, 1972

3,686,530

INVENTOR:
HENRY A. BOGUT
BY: Marshall N. Dickler
ATTY.

CURRENT LIMITED BATTERY PACK

BACKGROUND

Battery operated equipment has come into extensive use in recent years for a great many purposes. One example of such equipment is portable two-way radios such as those used by police departments, construction companies and refining industries to allow communication between a central location and employees working at a number of locations.

A problem in the use of such equipment and the batteries necessary to power them is that the equipment may become damaged and develop a short circuit which can short circuit the battery. A substantial amount of current will then be drawn from the battery, which can cause damage to the radio circuitry and/or destroy the battery. This high current can also produce sparks and/or arcing.

The above stated problem becomes particularly acute in certain industries where the atmosphere in which the units and batteries are used is explosive. Oil fields, refineries, and graineries are typical examples of industries where the atmosphere is filled with fumes or particles which would explode in the presence of a spark. In these industries it is mandatory that any equipment used in an explosive atmosphere be designed to preclude the possibility of producing sparks and/or arcing which could ignite the atmosphere.

Although protection circuits have been previously used to limit the current from a battery, most are automatic resetting circuits which would attempt to return to normal operation after a particular period of time, or when the short circuit was apparently removed. When such devices are used in a hazardous atmosphere, it is desirable that the reset function be manually controlled so that the danger of a high current producing arcing or sparks during a reset attempt, and while the equipment is still in a hazardous atmosphere is substantially eliminated. Those circuits which are manually resettable require disconnection from either the battery or the load, and this normally precludes packing the battery and protection circuitry into a single sealed container.

A further requirement of protection circuits which are to be used to protect a battery is that they require minimum battery current during normal battery usage and will not be rapidly and completely discharged by the protection circuit when it is operative. It is also desired that the protection circuit be compact so that it can be built with the battery as a compact unit.

SUMMARY

It is an object of this invention to provide a battery pack including a battery and protection circuitry for limiting the current to a load.

Another object of this invention is to provide a battery pack including a battery and protection circuitry wherein the batter and protection circuitry are sealed in a container requiring minimum size.

Yet another object of this invention is to provide a battery pack for use in a hazardous atmosphere environment.

Still another object of this invention is to provide a battery pack including a battery and protection circuitry which must be manually and externally reset after the protection circuit has been activated.

A further object of this invention is to provide a battery pack including a battery and protection circuitry wherein the protection circuitry requires minimum power when not limiting the current.

In practicing this invention, a battery pack is provided which includes a battery and protection circuitry for limiting the current supplied by the battery to a load. The protection circuitry includes a normally non-conductive silicon controlled rectifier (SCR) and magnetic reed switch serially connected across the battery. A current sensing circuit coupled between the battery and load, and to the SCR, senses excess current and causes the SCR to fire and conduct current. A regulating transistor or relay couples the battery to the load. The relay or transistor is coupled to the SCR, and is responsive to conduction thereof to prevent current flow to the load. The battery, magnetic reed switch, SCR, and regulating transistor or relay are encased in a sealed container to prevent sparks and arcing, and allow usage in a hazardous atmosphere. The SCR is cut off, allowing current to flow to the load, by actuating the reed switch with an externally supplied magnetic field such as may be supplied by a permanent magnet. Actuation of the magnetic reed switch breaks the current path to the SCR.

THE DRAWING

DETAILED DESCRIPTION

Figure 1:
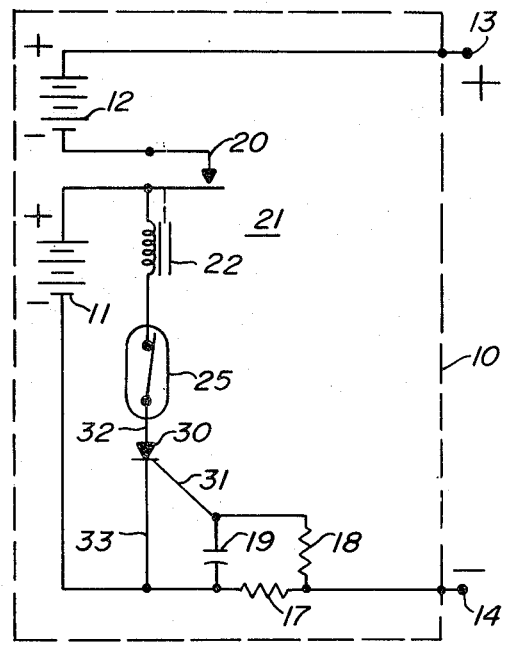
FIG. 1 is a schematic diagram of one embodiment of a battery pack incorporating of features of this invention.

Referring to FIG. 1, there is shown a battery pack 10 which includes battery sections 11 and 12. Each section may include one or more battery cells and is preferably of the rechargeable type, such as nickel cadmium. Terminals 13 and 14 in battery pack 10 couple the positive and negative terminals of battery sections 12 and 11 respectively to an external load, such as a two-way radio. The positive terminal of battery section 12 is connected directly to external load terminal 13 and the negative terminal of battery section 11 is coupled through sensing resistor 17 to external load terminal 14. The positive terminal of battery section 11 is coupled through normally closed contact 20 of relay 21 to the negative terminal of battery section 12. Relay coil 22 of relay 21, magnetic reed switch 25, having a normally closed contact therein, and silicon controlled rectifier (SCR) 30 are series connected and coupled in parallel with battery section 11.

In operation, if the desired load, such as a two-way radio, is connected to terminals 13 and 14, battery sections 11 and 12 will supply the necessary current and voltage to the load through the circuit including relay contact 20 and sensing resistor 17. Resistor 17 is selected to be a low resistance so that a very small percentage of the total battery voltage will be developed thereacross. Should a malfunction occur in the load, as for example, a short circuit in the radio circuitry, the impedance connected between terminals 13 and 14 will be substantially reduced. The voltage developed by battery sections 11 and 12 will cause a short circuit current to flow through sensing resistor 17, developing a gating voltage thereacross. The gating voltage is coupled through resistor 18 to gate 31 of SCR 30, firing the rectifier and causing it to conduct current from anode 32 to cathode 33 or SCR 30. The firing of SCR 30 provides a conductive series path through relay coil 22, the normally closed contact in magnetic red switch 25 and SCR 30. The series combination of battery section 12 and resistor 17, in parallel with battery section 11, due to the short circuit across terminals 13 and 14, will cause a voltage to be developed across the relay coil 22, in series with magnetic reed switch 25 and SCR 30. This voltage will cause relay 21 to energize, opening contacts 20 and breaking the current path to terminal 13. With the current path to terminal 13 opened, short circuit current will no longer flow to the shorted load, thus preventing sparks and/or arcing which can cause an explosion. Relay contact 20 is inserted between cells of the battery in the embodiment in order to provide a sufficient voltage, when a short circuit occurs at terminals 13 and 14, to energize relay 21. This arrangement is necessary because of the low resistance value selected for sensing resistor 17. Sensing resistor 17 is selected to be in the order of 0.5 ohms or less so that a very small percentage of the battery voltage will appear thereacross, and so that the gating voltage will only be developed when a short circuit occurs. Because the resistance of sensing resistor 17 is low, the voltage developed thereacross by battery section 11 would not be adequate to energize coil 22. Relay contact 20 was therefore inserted between battery sections 11 and 12 so that when a short circuit occurred between terminals 13 and 14, battery section 12 will be placed in series with sensing resistor 17 across relay coil 22 developing a sufficient voltage to energize relay 21. It is to be understood that if the value of sensing resistor 17 is substantially increased, the battery sections 11 and 12 could be connected together and relay contact 20 could be connected between the positive terminal of section 12 and external load terminal 13.

Battery section 11, in parallel with relay coil 22, magnetic reed switch 25 and SCR 30, provides a sufficient voltage to maintain relay coil 22 in its energized state after contact 20 is opened, thereby maintaining contact 20 in an open position and preventing further current from being supplied to terminal 13.

Relay coil 22 is selected such that its resistance prevents battery section 11 from being rapidly discharged through the series combination of coil 22, magnetic reed switch 25, and SCR 30. In the embodiment shown, battery section 11 is a 10 volt battery and relay coil 22 is 100 ohms. The current drawn through coil 22 when 1000 20 is opened is therefore approximately 10 milliamperes. This prevents battery section 11 from being discharged at a rate which would destroy the section capacity and prevent recharging.

Resistor 18, coupled from terminal 14 to gate 31 of SCR 30 limits the current supplied to the gate of SCR 30, preventing the SCR from being destroyed by excessive gate current. Resistor 18, and capacitor 19, coupled from gate 31 to the negative terminal of battery section 11, also act as an integrator, to prevent gate 31 of SCR 30 from being forward biased by the surge current which occurs when a load is initially coupled between terminals 13 and 14.

When the short circuit in the external load is corrected, or the unit in which the battery pack 10 is located has been removed from the hazardous atmosphere, battery pack may be manually reset to its operative condition. Battery pack 10 is reset by applying a magnetic field, normally supplied by a small permanent magnet, adjacent magnetic reed switch 25. The magnetic field energizes reed switch 25 causing the contact therein to open. With the contact in magnetic reed switch 25 opened, the series path through relay coil 22, magnetic reed switch 25 and SCR 30 is broken, causing SCR 30 to reset and become nonconductive. Relay coil 22 will deenergize allowing contact 20 to return to its normally closed position. The magnetic field produced by the permanent magnet may now be removed so that the contacts of reed switch 25 close. Battery pack 10 is now reset and can again be used to supply the necessary current to an external load connected between terminals 13 and 14.

When SCR 30 is nonconductive, no current is used by the protection circuit. As SCR 30 is nonconductive during normal battery operation, a battery may be supplied for operating the external load which requires no additional size or current capacity for operation of the protection circuitry. This is of particular importance in products such as two-way radios where the battery pack can account for as much as one third the entire unit's volume. Any additional volume necessary to operate the protection circuitry would here be especially undesirable.

In order to prevent an arc or spark from occurring when contact 20 is opened which can ignite the atmosphere, relay 21 and contact 20 are hermetically sealed in a container. Magnetic reed switch 25 is also glass enclosed and hermetically sealed to prevent sparks and/or arcing when its contact is opened. Furthermore, battery sections 11 and 12, relay 21, magnetic reed switch 25, SCR 30 and the resistors and capacitors shown are also completely sealed in a battery pack housing such as that shown in FIG. 3 and described in a subsequent portion of this application in connection with the circuit shown in FIG. 2.

Figure 2:
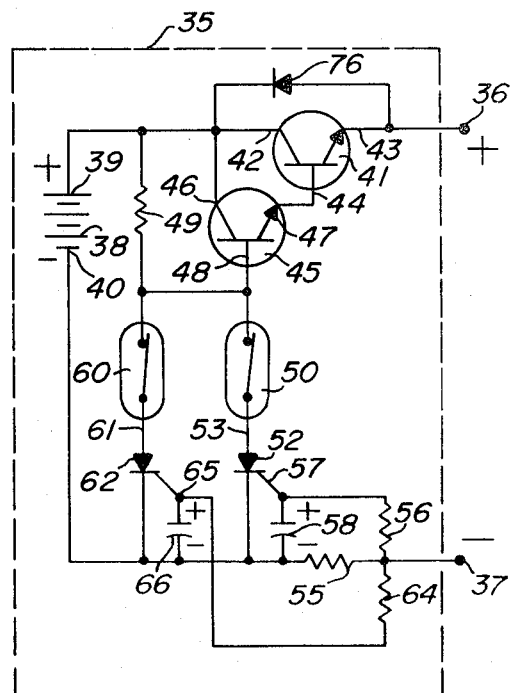
FIG. 2 is a schematic diagram of a second embodiment of a battery pack incorporating the features of this invention.

Referring to FIG. 2 there is shown a second embodiment of a battery pack including the features of this invention. Battery pack 35 includes external load terminals 36 and 37 for connecting the battery pack to an external load. Battery 38 within battery pack 35 may be a multi-cell battery, preferably a rechargeable battery of the nickel-cadmium type, having a positive terminal indicated at 39 and a negative terminal indicated at 40.

Positive terminal 39 is coupled to external load terminal 36 through a main regulating transistor 41. Transistor 41 has a collector electrode 42 connected to positive battery terminal 39, and an emitter electrode 43 coupled to external load terminal 36. Transistor 41 functions as a variable impedance for controlling potential applied to the external load. Transistor 41 is controlled by transistor 45, connected in cascade with transistor 41 so that the combined gain of transistors 41 and 45 is equal to the product of their individual gains. Transistor 45 has its collector electrode 46 coupled to collector electrode 42 of transistor 41, and its emitter electrode 47 connected to base electrode 44 of transistor 41. Transistors 41 and 45 are coupled together in what is commonly termed a Darlington configuration, in order to provide enough gain so that the variable impedance function can be controlled with a minimum of current. Although a Darlington configuration is shown, a single variable impedance controlling element such as transistor 41 may be used if sufficient operating base current is supplied, or if the single element has a sufficient gain. Resistor 49, coupled from collector 46 to base 48 of transistor 45, provides a forward bias from positive terminal 39 of battery 38 to base 48 of transistor 45 for forward biasing transistors 41 and 45. A magnetic reed switch 50, which has a normally closed contact therein, has one terminal of the contact coupled to base 48 of transistor 45 and the second terminal of the contact coupled to anode 53 of SCR 52. Cathode 54 of SCR 52 is coupled to negative terminal 40 of battery 38 and through sensing resistor 55 to external load terminal 37. Reed switch 50 and SCR 52, and the control circuit therefor, operate in the same manner described for switch 25 and SCR 30 in FIG. 1. The Darlington transistors 41 and 45 operate in the manner of relay 21 of FIG. 1, in addition to the regulating action which has been described. In normal operation, SCR 52 is nonconductive. The bias voltage supplied by resistor 49 to base 48 of transistor 45 renders transistors 45 and 41 conductive to allow current to flow from battery 38 through a load, coupled to external load terminals 36 and 37. During normal operation then the only current required by the protection circuit is the base current coupled through resistor 49 to base 48 of transistor 45. This base current is extremely low.

Should a fault occur in the external load which produces a short circuit across terminal 36 and 37, a substantial short circuit current will flow from positive terminal 39 of battery 38 through transistor 41, terminals 36 and 37 and sensing resistor 55 and back to negative terminal 40 of battery 38. The voltage developed across sensing resistor 55 is coupled through resistor 56 to gate 57 of SCR 52 causing SCR 52 to fire in the manner described in connection with FIG. 1. This produces a ground potential at base 48 of transistor 45 rendering transistors 41 and 45 nonconductive. With transistors 41 and 45 nonconductive, current is no longer provided to the external load coupled to load terminals 36 and 37.

Resistor 49 is selected such that it provides the proper bias to transistors 41 and 45, and also acts to limit the current drain from battery 35 when the conductive path is completed by SCR 52. In this embodiment, battery 38 is a 12 volt battery and resistor 49 is a 1000 ohm resistor. The current drain from battery 38 when SCR 52 is conductive is therefore approximately 12 milliamperes. This prevents battery 38 from being discharged at a rate which would destroy its capacity and prevent recharging.

A second magnetic reed switch 60 and a second SCR 62 are connected in parallel with relay 50 and SCR 52. Resistor 64 is coupled between external load terminal 37 and gate 65 of SCR 62, and capacitor 66 is coupled from gate 65 to negative terminal 40. Magnetic reed switch 60, SCR 62, capacitor 66 and resistor 64 operate in parallel, and perform a function identical to magnetic reed switch 50, SCR 52, resistor 56 and capacitor 58. They provide a redundancy in the protection circuitry so that if a component such as SCR 52 becomes defective, there is a secondary or backup component 62 which will operate if a short circuit occurs in the load connected to terminals 36 and 37.

Diode 76 shown coupled to collector electrode 42 and emitter electrode 43 of transistor 41, provides a conductive path for current flow in a direction opposite to the normal current flow direction through transistor 41. This allows battery 38 in battery pack 35 to be charged from an externally connected charger which can be coupled to terminals 36 and 37.

When battery pack 35 is removed from the hazardous atmosphere, or after the short circuit condition in the externally connected load has been found and corrected, the battery pack may be reset allowing normal operating current to again flow to the external load coupled to terminals 36 and 37. The unit may be reset by providing and externally supplied magnetic field, such as may be provided by a small permanent magnet, adjacent magnetic reed switches 50 and 60. The magnetic field energizes magnetic reed switches 50 and 60 causing the normally closed contact located therein to open. With the contacts in magnetic reed switches 50 and 60 opened, the current paths provided to SCR's 52 and 62 will be broken, resetting both SCR's to their nonconductive state. When the externally supplied magnetic field is removed, the contacts in magnetic reed switches 50 and 60 will again close providing a conduction path to SCR's 52 and 62. Neither of the SCR's however will conduct unless a sufficient gating voltage is developed across gating resistor 55. With SCR's 52 and 62 nonconductive the ground potential is now removed from base 48 of transistor 45, and the potential developed across resistor 49 will again render transistors 41 and 45 conductive to allow current to flow to the external load coupled to terminals 36 and 37.

Figure 3:
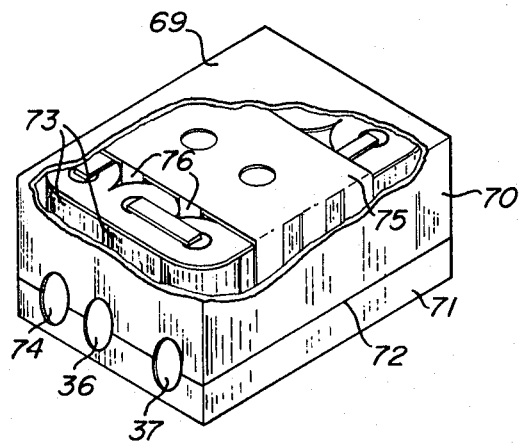
FIG. 3 is a perspective drawing and cutaway view of the battery pack of this invention.

Referring to FIG. 3, there is shown a housing 69 for containing the battery pack and protection circuitry shown and described in FIGS. 1 and 2. The housing 69 may be formed in two sections 70 and 71 from a plastic material, which is sealed as shown at 72 to prevent any potential circuit arcing or sparks from reaching the external atmosphere and causing an explosion.

The individual cells of battery 38 are shown at 73 and are interconnected to form the battery. External load terminals 36 and 37 are shown molded into housing 69. A third terminal, 74, is molded into housing 69 and is internally connected to terminal 36. This provides a charging terminal for connecting battery pack 35 to an external charger. Printed circuit board 75 is secured to the battery cells with portions thereof 76 extending into the space between cells. The printed circuit board contains the protection circuit components shown in FIG. 2.

As can be seen, a battery pack has been provided including a battery and protection circuit for limiting the current to an external load. The battery and protection circuit may be sealed in a container which requires a minimum size and which prevents arcing in the battery pack from affecting an external atmosphere. The protection circuitry requires minimum current when it is inoperative and may manually reset after the protection circuit is once triggered and the unit has been removed from a dangerous atmosphere.

I claim:

1. A protection circuit for terminating the current from a battery to a load in response to a load current in excess of a predetermined level, said protection circuit including in combination, first circuit means operative to couple said battery to said load for applying current thereto, second circuit means including a reed switch having a first normally closed position and a second magnetically actuated open position, a silicon controlled rectifier having first and second principal electrodes coupled in series with said reed switch, and a gate electrode, a second reed switch having a first normally closed position and a second, magnetically actuated open position, a second silicon controlled rectifier having first and second principal electrodes coupled in series with said reed switch, and a gate electrode, said second reed switch and second silicon controlled rectifier being coupled in parallel with said first reed switch and first silicon controlled rectifier, said second circuit means being coupled in parallel with at least a portion of said battery with said first reed switch and first silicon controlled rectifier, and said second reed switch and second silicon controlled rectifier forming series paths thereacross, and third circuit means coupled to said load and said first and second silicon controlled rectifier gate electrodes and operative in response to the load current exceeding said predetermined level to fire one of said first and second silicon controlled rectifiers allowing conduction therethrough, said first circuit means being coupled to said second circuit means and operative in response to conduction of one of said first and second silicon controlled rectifiers to terminate the current to said load, said first and second reed switches being operable to said second open position to open said second circuit means series paths and terminate conduction of said first and second silicon controlled rectifiers.

2. The protection circuit of claim 1 wherein said third circuit means includes resistance means coupled to said battery, to said load, and to said gate electrode, said resistance means developing a voltage thereacross in response to said load current which varies in accordance with the load current, said silicon controlled rectifier being operative in response to said voltage exceeding a predetermined level to fire and allow conduction therethrough.

3. The protection circuit of claim 2 wherein said first circuit means includes relay means, said relay means having means forming a closed circuit for coupling said load to said battery, said relay means being operative in response to conduction of said silicon controlled rectifier to open said circuit for terminating the load current.

4. The protection circuit of claim 3 wherein said relay means includes a normally closed contact thereon for coupling said load to said battery, and a relay actuation coil coupled to said second circuit means and responsive to conduction of said silicon controlled rectifier to energize and open said contact for terminating the load current.

5. The protection circuit of claim 2 wherein said first circuit means includes semiconductor means connecting said battery to said load, said semiconductor means being coupled to said switch means and operative in response to conduction of said silicon controlled rectifier for terminating the current to said load.

6. The protection circuit of claim 5 wherein said first circuit means includes a first transistor having base emitter and collector electrodes, said collector and emitter electrodes coupling said battery to said load and said base electrode being coupled to said switch means, said transistor operative in response to conduction of said silicon controlled rectifier for terminating the current to said load.

7. The protection circuit of claim 5 wherein said first circuit means includes a first transistor having a collector and emitter electrode for connecting said battery to said load, and a base electrode, a second transistor having a collector electrode coupled to said first transistor collector electrode, an emitter electrode coupled to said first transistor base electrode, and a base electrode coupled to said switch means, bias means coupled from said collector electrodes to said base electrode of said second transistor for rendering said transistors conductive to pass said load current, said first and second transistors operative in response to conduction of said silicon controlled rectifier for terminating the current to said load.

8. A battery pack for use in a battery operated device and including a protection circuit for terminating the current supplied to a load, said battery pack including in combination, a battery having a terminal for providing a potential of one polarity and a second terminal for providing a potential of opposite polarity, first circuit means operative to couple said battery to said load for applying current thereto, second circuit means including a reed switch having a first normally closed position for allowing conduction therethrough and a second magnetically actuated open position for inhibiting conduction therethrough, and a silicon controlled rectifier having first and second principal electrodes coupled in series with said reed switch, and a gate electrode, said second circuit means being coupled in parallel with at least a portion of said battery with said reed switch and said silicon controlled rectifier first and second principal electrodes forming a series path thereacross, and third circuit means coupled to one of said battery terminals and to said silicon controlled rectifier and operative in response to the current to said load exceeding said predetermined level to fire said silicon controlled rectifier allowing conduction therethrough, said first circuit means being coupled to said reed switch and operative in response to conduction of said silicon controlled rectifier to terminate the current to said load, said reed switch being actuated by an externally supplied magnetic field and operative to open said series path and terminate conduction of said silicon controlled rectifier, and a housing for containing said battery and protection circuit, said housing having contacts thereon coupled to said battery terminals for coupling said battery terminals to said load and for charging said battery, said housing being sealed to isolate said battery and protection circuit.

9. The battery pack of claim 8 wherein said third circuit means includes resistance means serially coupled between one of said battery terminals and said load, and to said gate electrode, said resistance means developing a voltage thereacross in response to said load current, said voltage varying in accordance with the load current, said silicon controlled rectifier operative in response to said voltage exceeding a predetermined value to fire and allow conduction therethrough.

10. The battery pack of claim 9 further including a second magnetically actuated reed switch and a second silicon controlled rectifier having first and second principal electrodes coupled in series with said second magnetically actuated reed switch, and a gate electrode, said second reed switch and said second silicon controlled rectifier coupled in parallel with at least a portion of said battery and said second reed switch and second silicon controlled rectifier forming a series path thereacross, said third circuit means being coupled to said second silicon controlled rectifier gate electrode and operative in response to the current to said load exceeding said predetermined level to fire said second silicon controlled rectifier allowing conduction therethrough, said first circuit means being coupled to said second reed switch and operative in response to conduction of said second silicon controlled rectifier to terminate the current to said load, said second reed switch being actuated to said second position by said externally applied magnetic field and operative to terminate conduction of said second silicon controlled rectifier.

11. The battery pack of claim 9 wherein said battery includes a plurality of cells coupled together, and said first circuit means includes a hermetically sealed relay, said relay having at least one normally closed contact for providing a conduction path between said cells and said load, said relay being operative in response to conduction of said silicon controlled rectifier to open said contact for breaking said conduction path and reducing the current supplied to said load by said battery pack to zero.

12. The battery pack of claim 9 wherein said first circuit means includes semiconductor means connecting one of said battery terminals to said load, said semiconductor means being coupled to said switch means and operative in response to conduction of said silicon controlled rectifier to limit the current to said load to zero.

13. The protection circuit of claim 12 wherein said first circuit means includes a first transistor having base emitter and collector electrodes, said collector and emitter electrodes coupling one of said battery terminals to said load and said base electrode being coupled to said switch means, said transistor operative in response to conduction of said silicon controlled rectifier to limit the current to said load to zero.

14. The battery pack of claim 12 wherein said first circuit means includes a first transistor having a collector and emitter electrode for connecting one of said battery terminals to said load, and a base electrode, a second transistor having a collector electrode coupled to said first transistor collector electrode, an emitter electrode coupled to said first transistor base electrode, and a base electrode coupled to said switch means, bias means coupled from said collector electrodes to said base electrode of said second transistor for rendering said transistors conductive to pass said load current, said first and second transistors operative in response to conduction of said silicon controlled rectifier to limit the current to said load, said bias means being further operative to limit the current from said battery when said silicon controlled rectifier is conductive.

15. The battery pack of claim 14 wherein said battery is a rechargeable battery, and further including a diode having an anode coupled to said emitter electrode of said first transistor and a cathode coupled to said collector electrode of said first transistor, said diode operative to allow charging of said battery from an externally connected charger.

16. The battery pack of claim 15 wherein said housing includes first and second sections sealed together to isolate said battery and protection circuitry, said first and second sections being formed from plastic material.

17. The battery pack of claim 12 wherein said battery is a rechargeable battery, and further including diode means coupled in parallel with said first circuit means and operative to allow charging of said battery from an externally connected charger.

* * * * *